(12) United States Patent
Brack et al.

(10) Patent No.: US 6,375,426 B1
(45) Date of Patent: Apr. 23, 2002

(54) PROTECTIVE EDGE MEMBERS FOR COMPOSITE FLEXURES

(75) Inventors: Robert Arnold Brack; Ernest Alfred Powell, both of Bedford; Dharam Jithender Reddy; Ronald Dean Rice, both of Hurst; Patrick Ryan Tisdale, Roanoke, all of TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/407,691

(22) Filed: Sep. 28, 1999

(51) Int. Cl.[7] .............................................. B64C 27/33
(52) U.S. Cl. ................... 416/134 A; 416/141; 416/224; 416/230; 29/889.1; 29/889.71; 428/193; 156/94
(58) Field of Search .............................. 416/134 A, 138, 416/141, 224, 230, 244 R, 241 A; 29/889.1, 889.71; 428/193; 156/94, 98

(56) References Cited

U.S. PATENT DOCUMENTS

| | | | |
|---|---|---|---|
| 4,189,283 A | 2/1980 | McCoubrey | |
| 4,293,276 A | * 10/1981 | Brogdon et al. | 416/134 A |
| 4,466,774 A | 8/1984 | Cycon et al. | |
| 4,746,272 A | * 5/1988 | Noehren et al. | 416/134 A |
| 4,818,179 A | 4/1989 | Toner et al. | |
| 4,898,515 A | 2/1990 | Beno et al. | |
| 4,966,802 A | 10/1990 | Hertzberg | |
| 5,340,423 A | 8/1994 | Jacaruso et al. | |
| 5,431,538 A | 7/1995 | Schmaling et al. | |
| 5,662,761 A | 9/1997 | Middelman et al. | |
| 5,690,474 A | * 11/1997 | Byrnes et al. | 416/134 A |
| 5,820,344 A | * 10/1998 | Hamilton et al. | 416/134 A |

* cited by examiner

*Primary Examiner*—Christopher Verdier
(74) *Attorney, Agent, or Firm*—James E. Walton; Hill & Hunn LLP

(57) ABSTRACT

An edge member for use on a composite flexure having an exposed edge surface. The edge member includes an innermost composite ply attached to the edge surface, an outermost composite ply attached to the innermost composite ply, and at least one interior composite ply disposed between the innermost composite ply and the outermost composite ply.

29 Claims, 1 Drawing Sheet

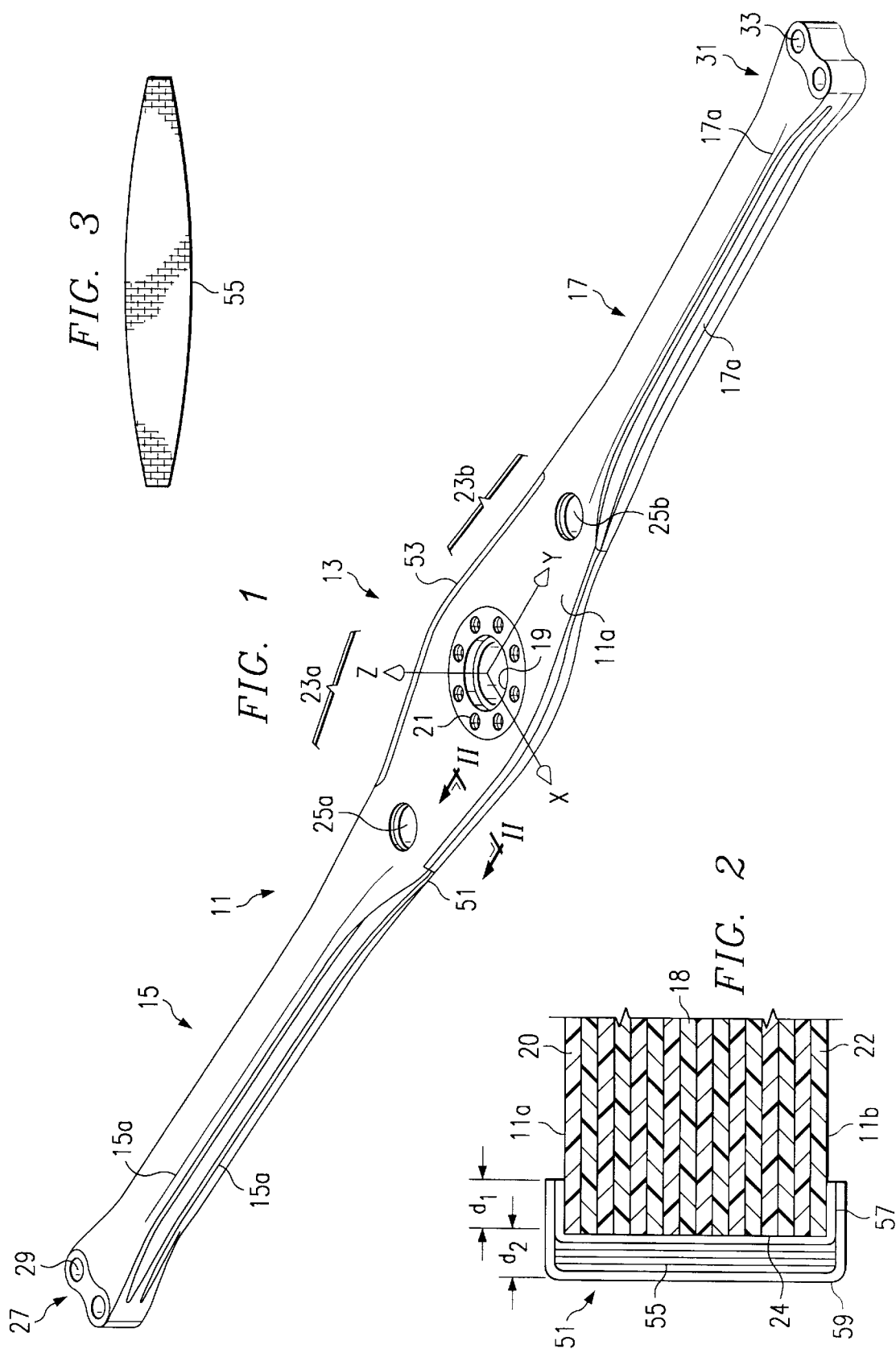

PROTECTIVE EDGE MEMBERS FOR COMPOSITE FLEXURES

BACKGROUND ART

1. Field of the Invention

The present invention relates generally to the prevention of mid-plane delamination failures in laminated composite flexures. In particular, the present invention relates to a method and apparatus for increasing the strength and fatigue life of helicopter main rotor yokes constructed of laminated composite materials.

2. Description of Related Art

Helicopter main rotor yokes combine to form main rotor hubs and provide means to connect the main rotor blades to the main rotor mast, which provides the necessary drive torque. These main rotor yokes are typically elongated members having center sections adapted for connection to the rotor mast, and outwardly extending arm sections. As is well known, the main rotor blades of helicopters exert high centrifugal forces on the rotor yokes of the main rotor hub. In addition to the high centrifugal forces, the main rotor yokes are subjected to a variety of other static and dynamic forces and motions, including feathering, flapping, and lead-lag forces and motions. In general, feathering forces and motions are torsional pitch forces and motions generated by the variable pitch of the rotor blades; flapping forces and motions are bending forces and motions generated by the rotor blades out of the plane of rotation of the rotor blades; and lead-lag forces and motions are bending forces and motions generated by the rotor blades in the plane of rotation of the rotor blades.

Because rotor yokes are subjected to such a large variety of tension and bending forces and motions, they must be both strong and flexible. Often this can only be achieved by the addition of moving parts and linkages. As such, conventional main rotor yokes and rotor hubs have to include complicated systems of bearings and supports to accommodate these forces. These are usually complex systems requiring a great deal of maintenance and service in the form of lubrication and inspection. This leads to high costs in the form of increased labor, increased materials, reduced operating time, and reduced service life. However, in recent years, these conventional rotor yokes, which require complex bearing and lubrication systems, have given way to "bearingless" rotor yokes made from composite materials, which do not require any bearings or lubrication systems.

Composite bearingless rotor yokes are specifically designed to compensate for the centrifugal, feathering, flapping, lead-lag, and other static and dynamic forces and motions exerted upon the rotor yokes by the rotor blades. Because these bearingless rotor yokes are composite materials, they provide all of the benefits generally associated with composite flexures: high strength-to-weight ratios, reduced weight, and reduced maintenance; without the need for costly linkages, bearings and lubrication systems. The lengths, thicknesses, and cross-sectional profiles of these composite rotor yokes can be varied to produce very specific mechanical strengths and properties. However, once the appropriate configuration and dimensions of such a rotor yoke have been determined for a particular application, there is little or no room for additional structural enhancements.

Although components manufactured from laminated composite materials offer the benefits listed above, it is commonly known that laminated composite flexures, particularly laminated composites having exposed edges, are susceptible to failure in the form of mid-plane delamination. Mid-plane delamination initiates at the exposed edges of the laminate due to edge effect concentrations and progresses inward toward the center. It is also commonly known that inter-laminar shear stresses are concentrated at the edges of laminated composite flexures. Bearingless composite rotor yokes are no exception to these rules. The cyclic bending loads and motions, both in-plane and out-of-plane, exerted upon composite rotor yokes can lead to mid-plane delamination fatigue failure.

Although the use of composite materials in constructing helicopter main rotor yokes represents a significant advancement in the art, the problem of mid-plane delamination has not been adequately resolved.

BRIEF SUMMARY OF THE INVENTION

It is an object of the present invention to provide an edge member for protecting laminated composite flexures having exposed edges by reducing or eliminating failure in the form of mid-plane delamination.

It is another object of the present invention to provide a method of reducing or eliminating failure in the form of mid-plane delamination in laminated composite flexures having exposed edges.

It is another object of the present invention to provide a helicopter having a bearingless main rotor yoke made of composite materials for which fatigue failure in the form of mid-plane delamination is reduced or eliminated.

It is another object of the present invention to provide a bearingless main rotor yoke for a helicopter, the bearingless main rotor yoke being made of composite materials for which fatigue failure in the form of mid-plane delamination is reduced or eliminated.

It is another object of the present invention to provide a method of extending the service life of a bearingless helicopter main rotor yoke made of laminated composite materials, the method including the step of adding composite edge members onto the edge of the bearingless helicopter main rotor yoke.

The above objects are achieved by providing an edge member having an innermost, an outermost, and internal layers or plies. The internal plies of the edge member conform to an exposed edge surface of the composite flexure. These internal plies have a height approximately equal to the height of the edge surface of the composite flexure. The innermost and outermost plies of the edge member also conform to the edge surface of the composite flexure. However, the innermost and outermost are larger than the internal plies so that the innermost and outermost plies can be overlapped onto and attached to the uppermost and lowermost plies of the composite flexure.

The present invention provides significant advantages. Because inter-laminar shear stresses generated within the composite flexure peak at or near the edge of the composite flexure, the edge member of the present invention can be configured to isolate the peak shear stresses. Because only the innermost and outermost plies of the edge member of the present invention are overlapped onto the composite flexure, the thickness of the composite flexure is not significantly increased. The edge member of the present invention protects the composite flexure from random impact damage, as from handling. Because the edge member of the present invention places a watertight seal on the exposed edges of the composite flexure, moisture uptake by the composite flexure in high humidity environments is greatly reduced. These and other objects and advantages of the present invention will be apparent in the following detailed description when read in conjunction with the accompanying drawings.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

FIG. 1 is a perspective view of a main rotor yoke for a helicopter according to the present invention; and FIG. 2 is an enlarged cross-sectional view of the main rotor yoke of FIG. 1 taken at II—II;

FIG. 3 is a plan view of an interior ply of the edge member of the present invention.

DETAILED DESCRIPTION OF THE PREFERRED EMBODIMENT

Referring to FIG. 1 in the drawings, the preferred embodiment of the protective edge member for composite flexures of the present invention is illustrated. A composite flexure for which the edge member of the present invention is particularly suited is a helicopter main rotor yoke 11. Yoke 11 is an elongated member having a center section 13 and two integral arm sections 15 and 17 that extend outwardly in opposite directions from center section 13. Yoke 11 will be described herein with reference to three orthogonal axes x, y, and z. Yoke 11 is of conventional laminar construction, preferably being made of a plurality of layers 18 (see FIG. 2) of composite materials, such as fiberglass. As is typical, the composite materials that form yoke 11 are layered one upon another, generally in the x-y plane, and then cured in a conventional manner. An uppermost layer 20 (see FIG. 2) of yoke 11 would form an upper surface 11a, and a lowermost layer 22 (see FIG. 2) of yoke 11 would form an opposing lower surface 11b (see FIG. 2). After yoke 11 has been laid up and cured, yoke 11 is trimmed to size. Other post-cure finishing and machining may be necessary. In a typical application, a composite flexure would be left with laminated edge surfaces generally parallel to the z axis that are exposed, such as exposed edge surface 24 of yoke 11 in FIG. 2). Such exposed edge surfaces are susceptible to various problems. The main problem is that mid-plane delamination initiates on the exposed edge surface due to edge effect concentrations and progresses toward the center of the composite flexure as the composite flexure is cyclically loaded. Another problem is that the exposed edge surfaces are susceptible to random impact damage, such as from handling. Another problem is that composite flexures with exposed edge surfaces uptake moisture in high humidity environments. The protective edge members of the present invention overcome these problems.

Center section 13 of yoke 11 preferably curves outward in the ±x directions and is thicker in the ±z directions, thereby providing added volume and strength in center section 13. A mast aperture 19 is located at the center of center section 13. Mast aperture 19 receives a conventional drive mast (not shown) of a conventional helicopter transmission (not shown). The drive mast is typically adapted to be coupled to yoke 11 by conventional fastening means, such as bolts (not shown), that pass through a plurality of bolt apertures 21 that are arranged around mast aperture 19. Bolt apertures 21 also provide a means for an additional rotor yoke (not shown but identical to yoke 11) to be coupled to yoke 11. Such coupling of yokes 11 forms a main rotor hub (not shown).

As center section 13 transitions into arm sections 15 and 17, yoke 11 tapers inward in two directions x and z, forming transition regions called flapping flexure regions 23a and 23b. Flapping flexure regions 23a and 23b experience a significant amount of out-of-plane bending, or flapping, forces and motions. Flapping flexure regions 23a and 23b transition into arm sections 15 and 17. An aperture 25a passes through yoke 11 along the z axis at a point where flapping flexure region 23a transitions into arm section 15. Likewise, an aperture 25b passes through yoke 11 along the z axis at a point where flapping flexure region 23b transitions into arm section 17. Apertures 25a and 25b receive a conventional elastomeric shear restraint bearing (not shown). It should be understood that apertures 25a and 25b may vary in size, shape, arrangement, number, and location dependent upon the particular shear restraint bearing system employed. Such variations would have no appreciable effect on the functionality of the present invention.

Continuing with reference to FIG. 1 in the drawings, arm sections 15 and 17 extend outward in opposite directions along axis y from flapping flexure regions 23a and 23b, respectively. Arm section 15 includes a plurality of flanges and curvatures 15a. In a symmetrical fashion, arm section 17 includes a plurality of flanges and curvatures 17a. The shape and dimensions of flanges and curvatures 15a and 17a are predetermined to allow arm sections 15 and 17 to twist in torsion to accommodate the feathering, or pitch, motions generated by variable pitch rotor blades (not shown). Arm section 15 terminates with an end portion 27 having apertures 29 configured to receive a sleeve member (not shown) that covers the connection of a first rotor blade (not shown) to yoke 11. In an identical fashion, arm section 17 terminates with an end portion 31 having apertures 33 configured to receive a sleeve member (not shown) that covers the connection of a second rotor blade (not shown) to yoke 11.

The length, thicknesses, and cross-sectional profiles of yoke 11 are chosen such that yoke 11 possesses certain selected mechanical properties in selected sections of yoke 11. As such, yoke 11 is capable of withstanding the centrifugal, feathering, flapping, lead-lag, and other static and dynamic forces and motions generated by the rotor blades. As described above, feathering forces and motions are torsional pitch forces and motions generated by the variable pitch of the rotor blades; flapping forces and motions are bending forces and motions generated by the rotor blades out of the plane of rotation of the rotor blades; and lead-lag forces and motions are bending forces and motions generated by the rotor blades in the plane of rotation of the rotor blades. By accommodating the centrifugal, feathering, flapping, lead-lag, and other static and dynamic forces and motions generated by the rotor blades solely by selectively determining the length, thicknesses, and cross-sectional profiles of yoke 11, there is no need for bearings. In other words, yoke 11 is a bearingless helicopter main rotor yoke of the type described above. Because yoke 11 does not have any bearings or other moving parts, there is no need for lubrication. This leads to significant savings in terms of weight, labor, and maintenance.

Edge surface 24 of laminated composite layers 18, 20, and 22 is exposed at least in the range of center section 13 and flapping flexure regions 23a and 23b. Because flapping flexure regions 23a and 23b are subjected to a significant amount of cyclical bending, or flapping, forces and motions, yoke 11 is particularly susceptible to mid-plane delamination failure at flapping flexure regions 23a and 23b. To prevent such mid-plane delamination failure in flapping flexure regions 23a and 23b, a plurality of elongated edge members 51 and 53 are attached to yoke 11 at flapping flexure regions 23a and 23b after curing and post-cure finishing of yoke 11. To provide additional strength, it is preferred that edge members 51 and 53 extend continuously through center section 13 from one flapping flexure region 23a to the other flapping flexure region 23b, as is shown in FIG. 1.

Referring now to FIGS. 2 and 3 in the drawings, an enlarged partial cross-sectional view of yoke 11 taken at II—II in FIG. 1 is illustrated in FIG. 2, and a front plan view of an interior ply is illustrated in FIG. 3. Each edge member 51 and 53 includes at least one interior layer or ply 55, at least one innermost layer or ply 57, and at least one outermost layer or ply 59. Interior plies 55, innermost ply 57, and outermost ply 59 are preferably made of a composite material, such as fiberglass. It is preferred that all of interior plies 55 be disposed between innermost ply 57 and outermost ply 59. It is also preferred that each interior ply 55 be long enough to extend over the combined length of center section 13 and both flapping flexure regions 23a and 23b (see FIG. 1). It is further preferred that the width of each interior ply 55 vary along the length such that the width of each interior ply 55 is equal to, and corresponding to, the thickness in the z direction of center section 13 and flapping flexure regions 23a and 23b. Thus, in plan view, each interior ply 55 looks generally like ply 55 in FIG. 3.

Each edge member 51 and 53 is prepared by first applying and attaching innermost ply 57 to edge surface 24 so as to cover edge surface 24. Innermost ply 57 is overlapped onto upper surface 11a and lower surface 11b of yoke 11 by a distance $d_1$. Distance $d_1$ is preferably about one inch, but may vary depending upon the composite flexure to which edge member 51 or 53 is applied. Innermost ply 57 is generally of the same shape as interior plies 55; however, because edge surface 24 is curved in the x-y plane and varies in thickness along the z axis, some darting, or removal of small triangular pieces, may be necessary to achieve a smooth, conforming fit between innermost ply 57 and yoke 11. After innermost ply 57 has been attached to edge surface 24, a plurality of interior plies 55, preferably four, are successively applied and attached to innermost ply 57.

After a selected number of interior plies 55 have been applied, outermost ply 59 is applied. Outermost ply 59 is generally shaped the same as innermost ply 57; however, outermost ply 59 is somewhat larger to allow coverage of the plurality of interior plies 55. Outermost ply 59 is also overlapped onto upper surface 11a and lower surface 11b of yoke 11 by distance $d_1$. Outermost ply 59 is applied and attached to innermost ply 57 at the portion of innermost ply 57 that extends distance $d_1$ onto upper surface 11a and lower surface 11b of yoke 11. Because innermost ply 57 and outermost ply 59 have relatively small thicknesses, the thickness of yoke 11 in the z direction is not significantly increased. It is preferred that edge members 51 and 53 be applied to yoke 11 at room temperature and allowed to cure at room temperature.

Each edge member 51 and 53 adds a distance $d_2$ to the width in the x direction of yoke 11. Because inter-laminar shear stresses peak at the exposed edge surfaces 24 of yoke 11, edge members 51 and 53 allow the peak shear stresses to be isolated within edge members 51 and 53. This reduces the effects of edge effect concentrations, thereby significantly reducing or eliminating the probability of failure from mid-plane delamination. In addition, edge members 51 and 53 allow yoke 11 to withstand greater motions for longer periods of time. For example, yoke 11 having edge members 51 and 53 has an endurance limit flapping angle capability that is 25% more than a similar yoke without edge members 51 and 53.

Edge members 51 and 53 completely cover and surround exposed edge surface 24, providing a watertight seal. Therefore, edge members 51 and 53 protect yoke 11 from random impact damage, such as from handling. In addition, because edge members 51 and 53 form a watertight seal around exposed edge 24 at central section 13 and flapping flexure regions 23a and 23b, yoke 11 is protected from inter-laminar moisture uptake in yoke 11 in high humidity environments is reduced.

Although the present invention has been described in terms of a bearingless helicopter main rotor yoke 11, it should be understood that the present invention may be used in any application involving laminated composite flexures having exposed edge surfaces to provide the protections described herein.

It should be apparent from the foregoing that an invention having significant advantages has been provided. While the invention is shown in a limited number of forms, it is not limited to just these forms, but is susceptible to various changes and modifications without departing from the spirit thereof.

We claim:

1. An edge member for use on a composite flexure having an upper surface, a lower surface, and an exposed edge surface, the edge member comprising:
    an innermost composite ply attached to the exposed edge surface;
    an outermost composite ply attached to the innermost composite ply; and
    at least one interior composite ply disposed between the innermost composite ply and the outermost composite ply;
    wherein the at least one interior composite ply does not overlap either the upper surface or the lower surface of the composite flexure.

2. The edge member according to claim 1, wherein the innermost composite ply overlaps onto the composite flexure.

3. The edge member according to claim 1, wherein the at least one interior composite ply is configured to conform to the exposed edge surface.

4. The edge member according to claim 1, wherein the innermost composite ply, the outermost composite ply, and each of the interior composite plies are made of the same composite material.

5. The edge member according to claim 4, wherein the same composite material is a fiberglass material.

6. A composite rotor yoke for connecting a rotor blade assembly to an aircraft, the composite rotor yoke comprising:
    an elongated composite member having an upper surface, a lower surface, and an exposed edge surface;
    a composite edge member attached to the exposed edge surface, the composite edge member comprising:
        an innermost composite ply attached to the exposed edge surface;
        an outermost composite ply attached to the innermost composite ply; and
        at least one interior composite ply disposed between the innermost composite ply and the outermost composite ply;
    wherein the at least one interior composite ply does not overlap either the upper surface or the lower surface of the elongated composite member; and
    wherein the composite edge member does not entirely surround the elongated composite member.

7. The composite rotor yoke according to claim 6, wherein the elongated composite member comprises:
   a center section;
   a plurality of flapping flexure regions integral with the center section; and
   an elongated arm section extending outward from each flapping flexure region, each elongated arm section terminating with an end portion adapted to receive the rotor blade assembly.

8. The composite rotor yoke according to claim 6, wherein the innermost composite ply overlaps onto the upper and lower surfaces of the elongated composite member.

9. The composite rotor yoke according to claim 6, wherein the outermost composite ply overlaps onto the upper and lower surfaces of the elongated composite member.

10. The composite rotor yoke according to claim 6, wherein the at least one interior composite ply is configured to conform to the exposed edge surface.

11. The composite rotor yoke according to claim 7, wherein the composite edge member is attached to the exposed edge surface at the center section and the plurality of flapping flexure regions.

12. The composite rotor yoke according to claim 6, wherein the elongated composite member is made of a fiberglass material.

13. The composite rotor yoke according to claim 6, wherein the composite edge member is made of a fiberglass material.

14. A helicopter comprising:
   an airframe;
   a transmission carried by the airframe;
   a bearingless rotor yoke coupled to the transmission, the bearingless rotor yoke comprising:
      an elongated composite member having an upper surface, a lower surface, and an exposed edge surface; and
      a composite edge member attached to the exposed edge surface, the composite edge member comprising:
         an innermost composite ply attached to the exposed edge surface;
         an outermost composite ply attached to the innermost composite ply; and
         at least one interior composite ply disposed between the innermost composite ply and the outermost composite ply;
         wherein the at least one interior composite ply does not overlap either the upper surface or the lower surface of the elongated composite member; and
   a plurality of rotor blades coupled to the bearingless rotor yoke.

15. The helicopter according to claim 14, wherein the elongated composite member comprises:
   a center section adapted to be coupled to the transmission;
   a plurality of flapping flexure regions integral with the center section; and
   an elongated arm section extending outward from each flapping flexure region, each elongated arm section terminating with an end portion adapted to receive the rotor blades.

16. The helicopter according to claim 14, wherein the innermost composite ply overlaps onto the elongated composite member.

17. The helicopter according to claim 14, wherein the outermost composite ply overlaps onto the elongated composite member.

18. The helicopter according to claim 14, wherein the at least one interior composite ply is configured to conform to the exposed edge surface.

19. The helicopter according to claim 15, wherein the composite edge member is attached to the exposed edge surface at the center section and the plurality of flapping flexure regions.

20. The helicopter according to claim 14, wherein the elongated composite member is made of a fiberglass material.

21. The helicopter according to claim 14, wherein the composite edge member is made of a fiberglass material.

22. A method of providing protection for a composite flexure having an upper surface, a lower surface, and an exposed edge surface, the method comprising the steps of:
   providing a composite edge member configured to cover the exposed edge surface comprising the steps of:
      providing an innermost composite layer configured to cover the exposed edge surface;
      providing at least one interior composite layer that does not overlap either the upper surface or the lower surface of the composite flexure; and
      providing an outermost composite layer; and
   attaching the composite edge member to the exposed edge surface;
   wherein the composite edge member does not entirely surround the composite flexure.

23. The method according to claim 22, wherein the step of attaching the composite edge member to the exposed edge surface comprises the steps of:
   attaching the innermost composite layer to the exposed edge surface;
   attaching the at least one interior composite layer to the innermost composite layer;
   covering the at least one interior composite layer with the outermost composite layer; and
   attaching the outermost composite layer to the innermost composite layer.

24. The method according to claim 23, wherein the protection is protection from mid-plane delamination.

25. The method according to claim 23, wherein the protection is protection from moisture uptake through the exposed edge surface.

26. The method according to claim 23, wherein the protection is protection from impact damage to the exposed edge surface.

27. The method according to claim 22, wherein the innermost composite layer, the at least one interior composite layer, and the outermost layer are made of a fiberglass material.

28. The method according to claim 22, wherein the step of attaching the composite edge member to the exposed edge surface is performed after the composite flexure has cured and been trimmed to size.

29. The method according to claim 22, wherein the step of attaching the composite edge member to the exposed edge surface is performed at a temperature that is below both the cure temperature of the composite flexure and the cure temperature of the composite edge member.

* * * * *